United States Patent [19]

Huei-Chin

[11] Patent Number: 4,839,967
[45] Date of Patent: Jun. 20, 1989

[54] SURVEYING METHOD ALLOWING GREATER FREEDOM IN POSITIONING THE SURVEYING INSTRUMENTS

[76] Inventor: Chen Huei-Chin, 3Fl., No. 10-2, Lane 433, Chilin Rd., Taipei, Taiwan

[21] Appl. No.: 137,925

[22] Filed: Dec. 28, 1987

[51] Int. Cl.$^4$ .............................................. G01B 11/27
[52] U.S. Cl. ...................................... 33/228; 33/1 H; 33/1 T
[58] Field of Search .................. 33/227, 228, 1 T, 1 H

[56] References Cited

U.S. PATENT DOCUMENTS

| | | | |
|---|---|---|---|
| 3,350,783 | 11/1967 | Whitehead | 33/228 |
| 4,097,998 | 7/1978 | Klimavicz et al. | 33/227 X |
| 4,302,885 | 12/1981 | Levine et al. | 33/228 |
| 4,513,504 | 4/1985 | Nussbaumer et al. | 33/1 H |

Primary Examiner—William D. Martin, Jr.
Attorney, Agent, or Firm—Lowe, Price, LeBlanc, Becker & Shur

[57] ABSTRACT

A method for surveying in which the surveying instrument may be positioned in substantially more locations than with prior art surveying methods. The surveying method employs a separate point at which a compass is positioned. The bearing of the object to be located relative to the compass is measured. The distance between a surveying instrument and this object is determined by setting the bearing of the surveying instrument equal to the bearing of the compass, measuring the distance between the compass and the surveying instrument, measuring the angle formed between the compass and surveying instrument and object and instrument, and then determining the distance between the surveying instrument and object using trigonometric principles.

1 Claim, 10 Drawing Sheets

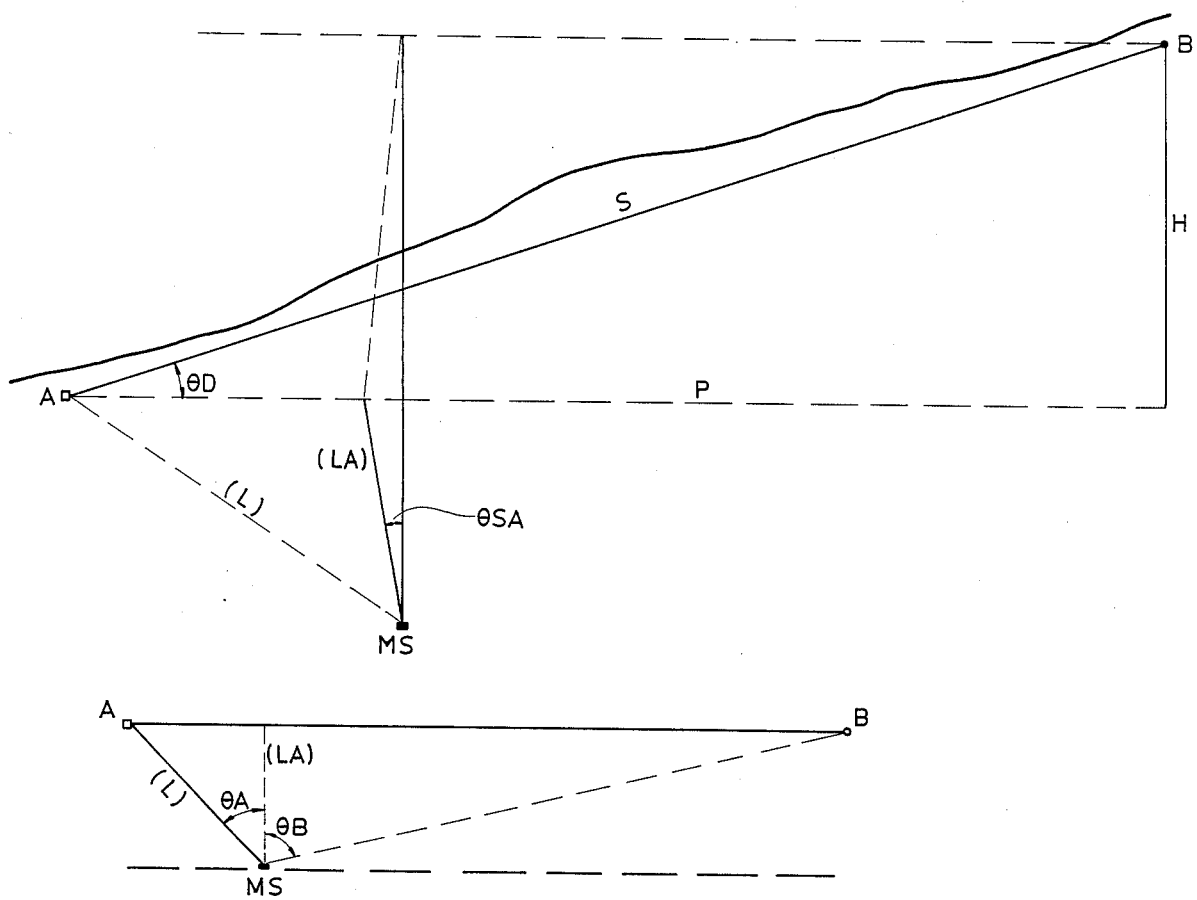
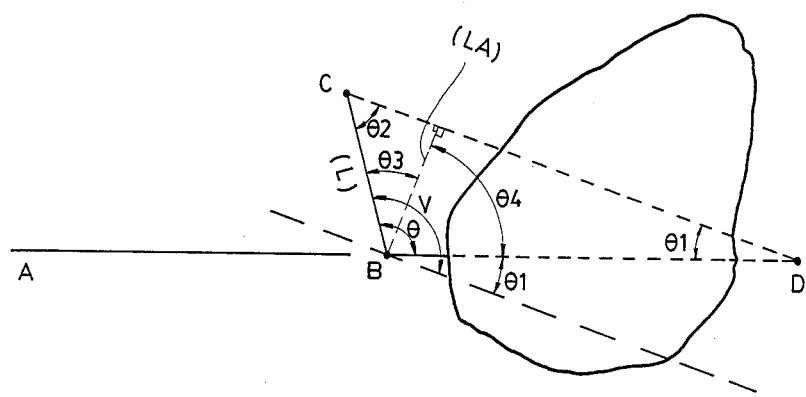
Fig 12
Fig 13

4,839,967

SURVEYING METHOD ALLOWING GREATER FREEDOM IN POSITIONING THE SURVEYING INSTRUMENTS

BACKGROUND OF THE INVENTION

The present inventin relates a free station surveying method, especially describe a surveying method that a surveying instrument can be set ay any place as a measuring station and different from the conventional surveying, with restriction of measure station the distance and angle of the third point can be measured in use of the principles of the vision logic, elevation and any elevation level can be surveyed easily and the surveying point also can be set, it can overcome the technical difficulties due to some specific topography which the continal surveying can not survey.

SUMMARY OF THE INVENTION

The present invention provides a surveying method that it can be set at any point, the main process is to position the transit and level respectively at suitable places, use the transit to measure a azimuth angle of the target, adjust the transit to enable it to be parallel with the objective, then turn the upper part of the transit towards the objective rotating at an angle of 90° and survey the distance between the transit and the level with a wave distance measure system, simultaneously, to adjust the semiround rail of the transit to read the angle of depression and elevation, it also provides the telescope rotating to sweep the spherical plane of the locked objective on it, therefore, the distance and the elevation can be obtained, in use of principle of spherical plane and the vision logic that rotating left and right to drop naturally, create the datum of different elevations and the parallel line of the top, the front and the ground in the same direction, the surveying and setting of the vertical line.

BRIEF DESCRIPTION OF THE DRAWING

FIG. 12 is the sketch to show how to measure the different elevations for the present invention.

FIG. 13 is the sketch of surveying to pass through the obstruct for the present invention.

DESCRIPTION OF THE PREFERRED EMBODIMENT

Figure 1:
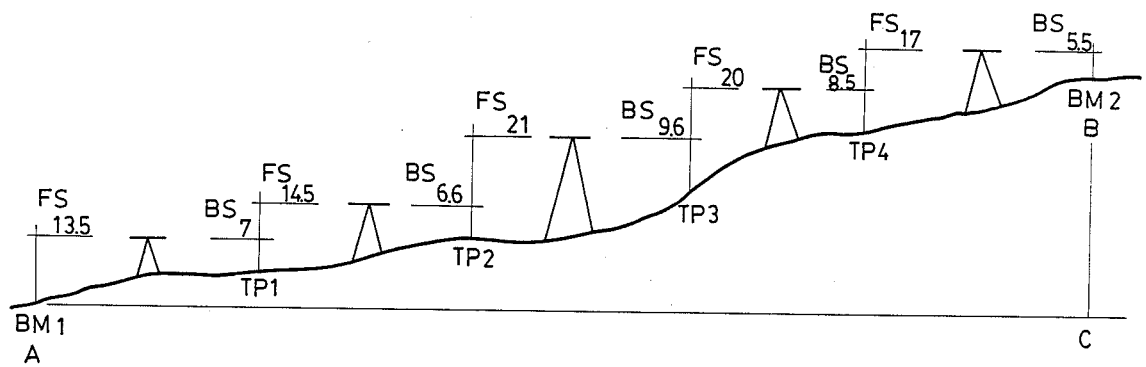
FIG. 1 is the sketch of the different elevations in the conventional surveying.

FIG. 1 is the sketch of the conventional surveying to measure the different elevations. Several turning points are positioned in view of the distance and the grade of the slope between the point A and point B, it is not only slow down the surveying process but also increase the capacity of the worker, enable the whole process of the operation becoming much troublesome. The different elevations in FIG. 1 equal the sum of FS to subtract the sum of BS; the distance between A B or A C and the grade of slope have to be taken by the process on the paper works.

Figure 2:
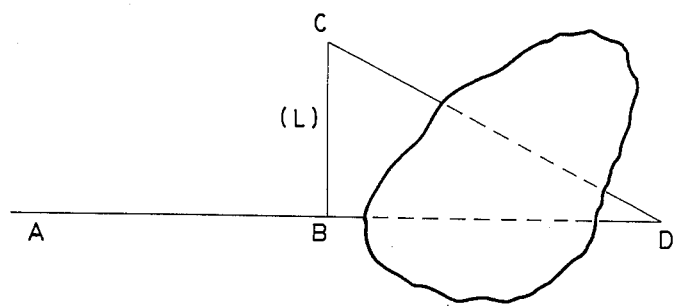
FIG. 2 is the sketch to show the conventional surveying to pass through the obstruct.

The conventional way to pass through the obstruct as shown in FIG. 2, for the distance from B to D, B, C have to be positioned as the perpendicular line of A, B, then survey the distance value of B, C and survey the included angle between B D, thus the distance between B, D can be taken in use of the triangulation. It seems very easy, but the point C has to be positioned first, then remove the surveying instrument ot the point C to survey the included angle of B D that is much troublesome, for the sake of preciseness, the distance between B C has to equal half of the unknown distance at least.

Figure 3:
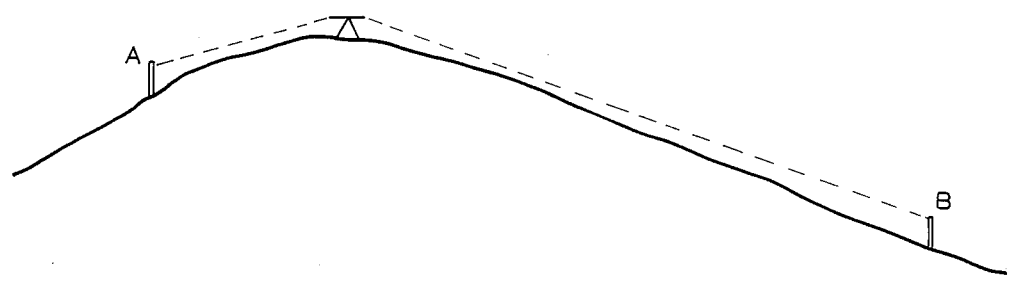
FIG. 3 is the sketch that two points can not see through on the slope in the conventional surveying.
Figure 3:
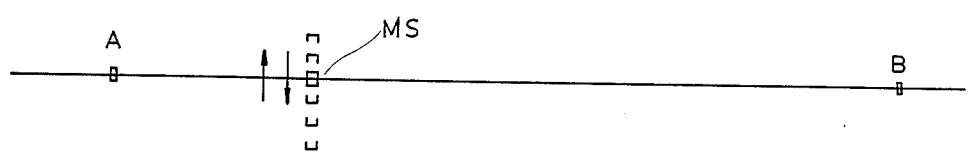

The conventional surving that the two points can not see through has shown in FIG. 3. The measuring station (MS) has to be positioned on the straight line of two points and can survey two points simultaneously, according the aim of balancing in to focus one point first, then turn back the telescope to survey the other one. If the measuring station (MS) is not on the straight line of said two points, the instrument has to be remove continuously until it is on the line, it also much troublesome.

It is understood as above mentioned that the conventional surveying is much troublesome. Before the content of the present invention is described, there are two principles on the nature that the present invention according to, have to be provided and described: the first one is the "vision logic".

The rails are two parallel lines that can be extened unlimitedly, on the optics or picture, two parallel lines intersect on one point also called vanishing point, in fact, the lines are still parallel, all it seen is nothing but prespective relation of the distance.

So, two similar objects are positioned respectively at point A and B on a rod in equal width, the further one at point B looks like smaller than the other at point A because of the distance even though they are in the same size, just the same as a row of wire poles in the same height, the further looks shortener, that is so called "vision logic".

Figure 4:
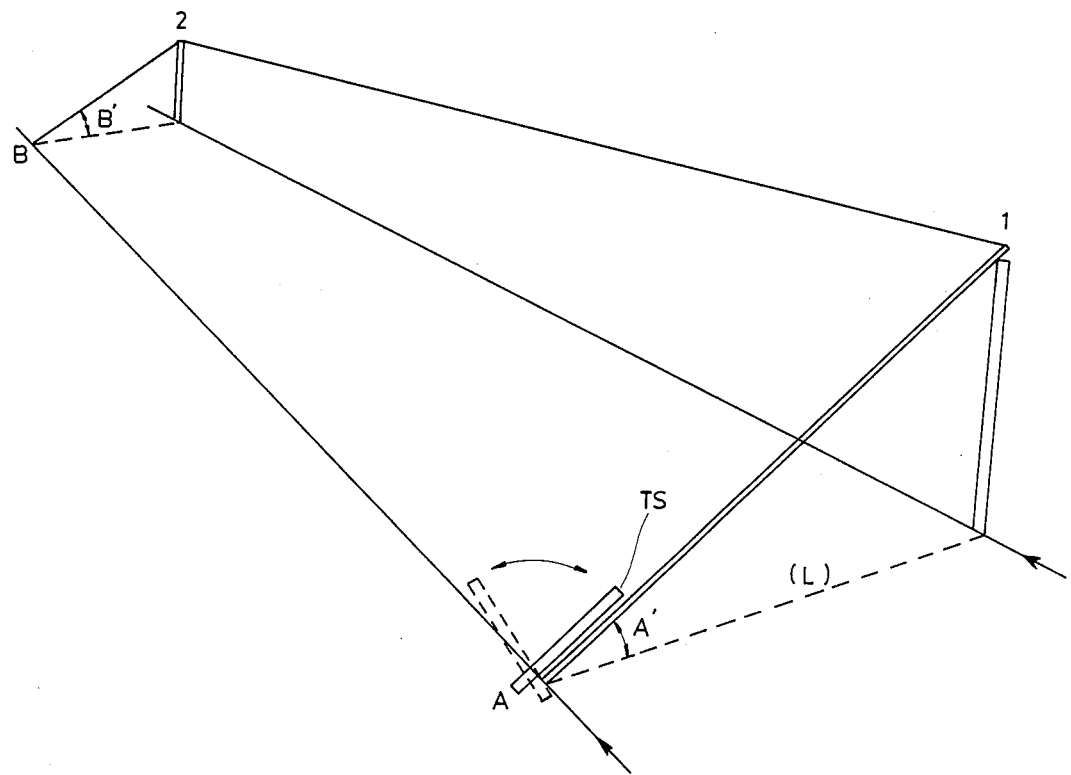
FIG. 4 is the sketch to describe the applied principles of the present invention.

When a person faces against a building, he has to raise his head to see the top of the building, while sweeping along the whole row of building (suppose the person is standing in front of a row of building in the same height), the head and the sight of the person looks further along the prespective line that drop down gradually, when the sight almost the same height as the building, the height of the last building which the person sweeping is the same height as the building in front of him in fact. Suppose instead of sight of the person with a telescope, if the telescope sweeps the whole row of building and rotates gradually, the angle of elevation will drop gradually along with the prespective line, at the time the telescope seems to be positioned on a spherical plane upward at a certain angle, rotates on the spherical plane with the center point as an axis, that is "Spherical plane phenomenon". Please refer to FIG. 4, suppose the road is covered with one piece of glass from the measuring station to the tops of the point 1 and 2 that are the same height as the target, the angle of the slopes are the same no matter how the distance are, the telescope (TS) is stuck on the plane of the glass to sweep left and right, the grade of the glass relates the elevation that the telescope sweep, the effect of the spherical plane is the same as the said glass shown in FIG. 4, in pace of the angle of the spherical plane the telescope (TS) sweeps in sector, until the cross hair in the telescope is aimed at the target, thus the angle can be got. In FIG. 4, suppose the target 2 is going to be surveyed and there is nothing at the target 1 that is for reference only, when the telescope (TS) is rotated leftwards and swept to the target 2, the included angle between the telescope and the horizontal plane may be small, as shown with the imaginary line, if the target 2 is further, but turn the telescope back from the spherical plane (the glass) to be a right angle (90°) with the parallel line A to B (as shown in the real line), the included angle A' between the telescope and the horizontal line (equal to the angle of the elevation of the target 1 at the same height in front of it) also equal to the elevation as if the telescope (TS) had been moved to B and aimed to survey the target 2, that is A'=B'.

Figure 5:
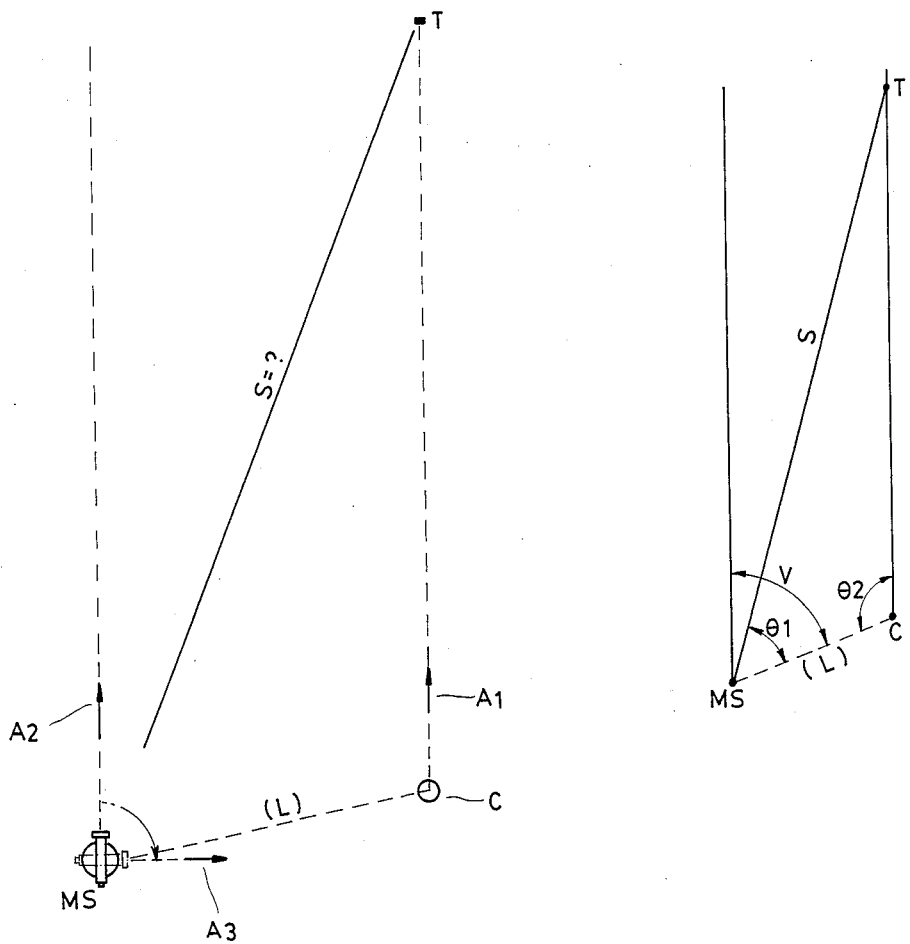
FIG. 5 is the sketch to describe the surveying principles of the present invention.

To make use of the said natural principles, the present invention "Free station surveying method" has been developed. Two operational principles of the surveying are going to be described first. Please refer to FIG. 5. For sake of the element that the station (MS) and the target (T) can be two parallel lines, a compass (C) has to be positioned for distance from the left or right of the station (MS) as "the third point", the bearing angle (as A1 shown) of the compass and target is surveyed by the compass, then adjust the surveying instrument at the station, enable it's bearing angle to be the same as the target (as A2 shown), that is the first principle, enable the direction line of the station to survey and the CT line that is linked with the compass (C) and the target (T) to be paralleled; the second principle, after the bearing angle is locked, turn the upper plate in the direction of the target to rotate 90° (as A3 shown), that is, enable the line to survey to be perpendicular with the line C to T, each item of surveying can be started after the angle reading base has been locked. The distance (L) between the station and the compass can be surveyed with a wave distance measure system on the surveying instrument, the angle θ1 and V can be surveyed with the angle ring on the surveying instrument, the angle θ2=180-V, by making use of the known L, θ1 and θ2 the distance (S) between the statation and the target can be surveyed. If the elevation of the target is going to be got, rotate the telescope in the direction of the target, then rotate screw/clamp knob to adjust the spherical plane to be at angle of depression or elevation, until the corss hair of the telescope is aimed at the point the target set, at the time, the angle of the spherical plane can be taken by the surveying instrument and the elevation also can be calculated.

Please refer to FIG. 4, the angle of the elevation A and B of the big glass with one side upward from the station are the same, so the angle of elevation that the telescope sweeping with the spherical plane is the same as the angle of elevation that moving the station to the point B to survey in the direction of the target, the height will be calculated after the L value and the angle of elevation are measured, this is the reason why to emphasize the parallel line. The second principle "rotate the surveying instrument in the direction of the target at an angle of 90°" that is exact to right angle, please refer to FIG. 5, the principle and the function are illustrated from the figure, therefore, the distance and the elevation of the target can be surveyed easily in use of the present invention. If there are several objects, the transit can be set at the original position to survey bearings in direction of each objects, the surveying instrument also do not need to remove, the distance and elevation can be obtained respectively in follow of the said process. If the surveying instrument needs to move just grasps the operation principles, to adjust the bearing the same as object then to rotate 90° in direction of object.

Figure 6:
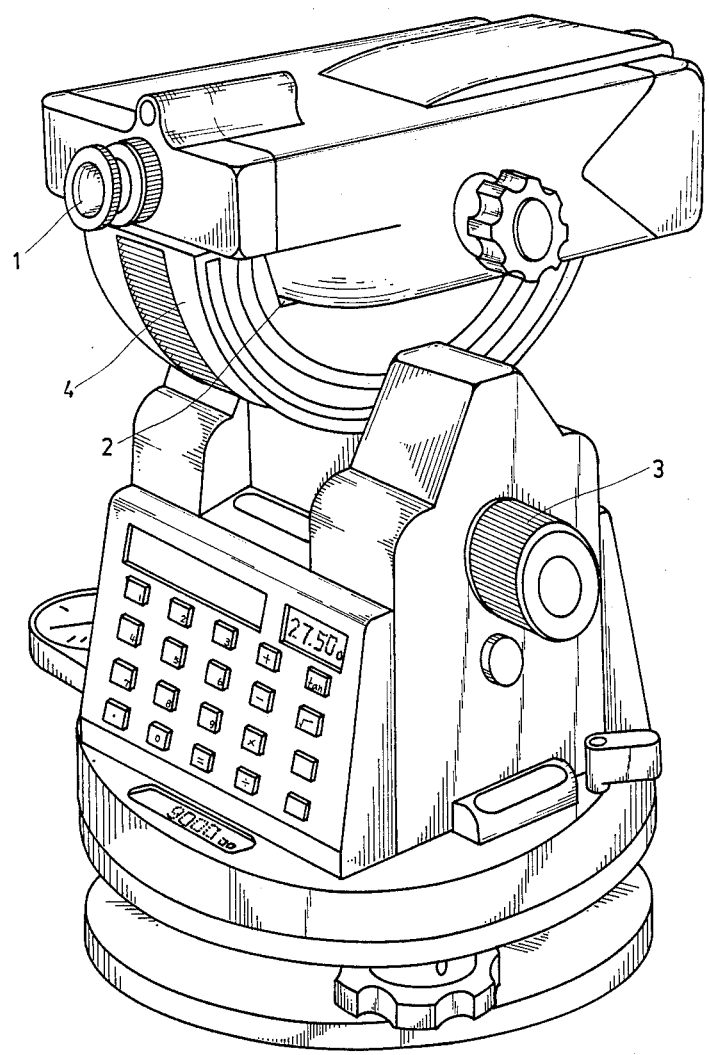
FIG. 6 is the prospective sketch of the surveying instrument for the present invention.
Figure 7:
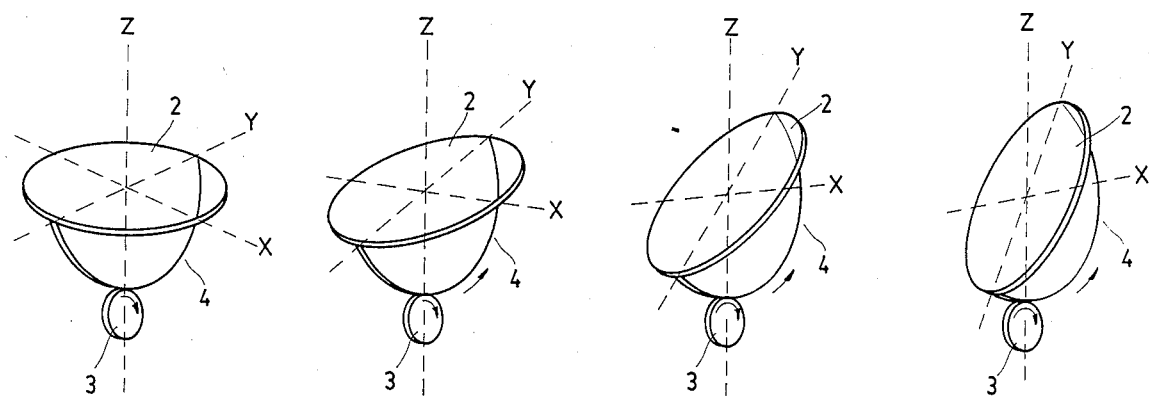
FIG. 7 is the related sketch of the three axes on the spherical plane of the surveying instrument for the present invention.

Before the effect and the preferred embodiment of the present invention are described further, it is necessary to described the surveying instrument that the present invention uses as show in FIG. 6. The telescope (1) is positioned on the spherical plane (2) and can rotate left and right, the angle of elevation or depression of the spherical plane (2) that can be obtained by adjusting the semi-round rail (4) with a screw / clamp knob, the angle value can be obtained directly from the surveying instrument. A computer stored various calculated formula is positioned inside the surveying instrument, input the surveyed distance and angle when it is used, the unknown distance and the elevation can be obtained. Other effects are the same as the conventional surveying instrument. As for the actions of the spherical plane (2) and the semiround rails are shown in FIG. 7 to ensure the axes of X, Y and Z having no deviation.

The present invention has three basic functions as follows:

1. The elevation and the distance of object can be obtained without the distance value between the station and the target by the present invention. (without making use of wave distance measure system)

Figure 15:
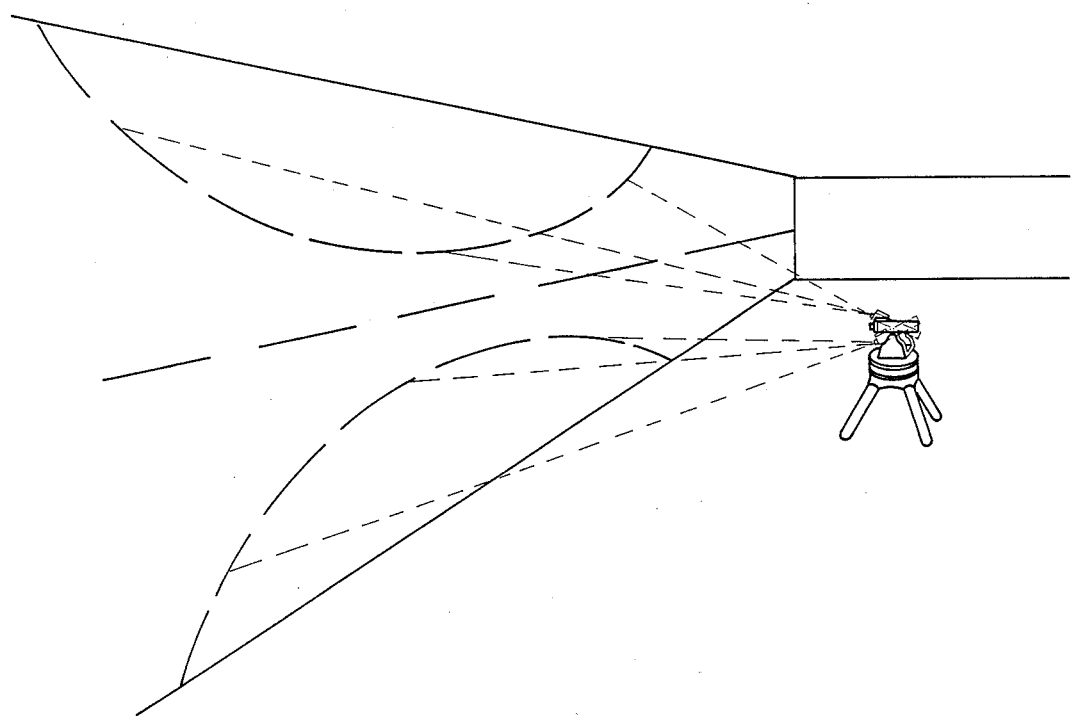
FIG. 15 is the sweeping sketch after the telescope of the conventional surveying instrument has been adjusted an angle of depression or elevation. (to compare with FIG. 9)

2. It is different from the conventional level surveying method, the conventional level can measure the elevation difference between the level and the surveyed elevations and can not measure or set for the horizontal line in any elevation for angle of depression or elevation. The present invention differents from the conventional is to break through the conventional definition, making use of the principle of the spherical plane and according to the vision logic to create the "Free station surveying method", it can be done to extend horizontally in the range of 85° left and right respectively on the horizontal line at any elevation, keeping the horizontal prespective extending line and set at the same elevation, it also includes to sweep, surveying and set in parallel at the top, the front and the ground in the same direction. Please refer to FIG. 9. If a telescope of a surveying instrument is upward in a certain angle and sweeps left and right, except the sweeping line that is the same height as the telescope (that is parallel with the horizintal plane) can achieve the effect at same height, after it is away from the front view the other sweeping line higher or lower, it will create deviation upward or downward as shown in FIG. 15.

3. It also has the effect of a plane table to survey and draft the place, distance and elevation etc. in any direction at one station.

Figure 8:
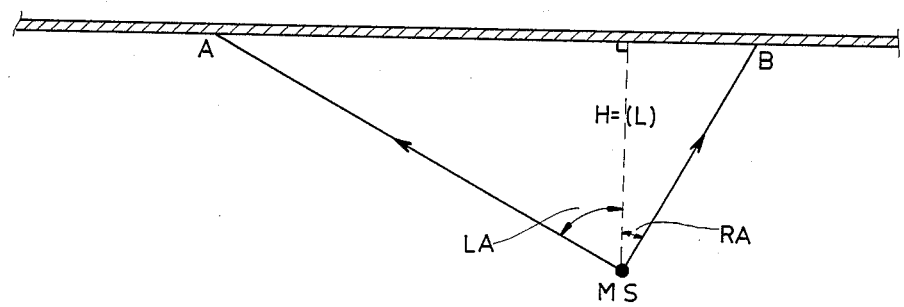
FIG. 8 is the sketch to take the bearing angle from the surface of the wall from free station for the present invention.
Figure 9:
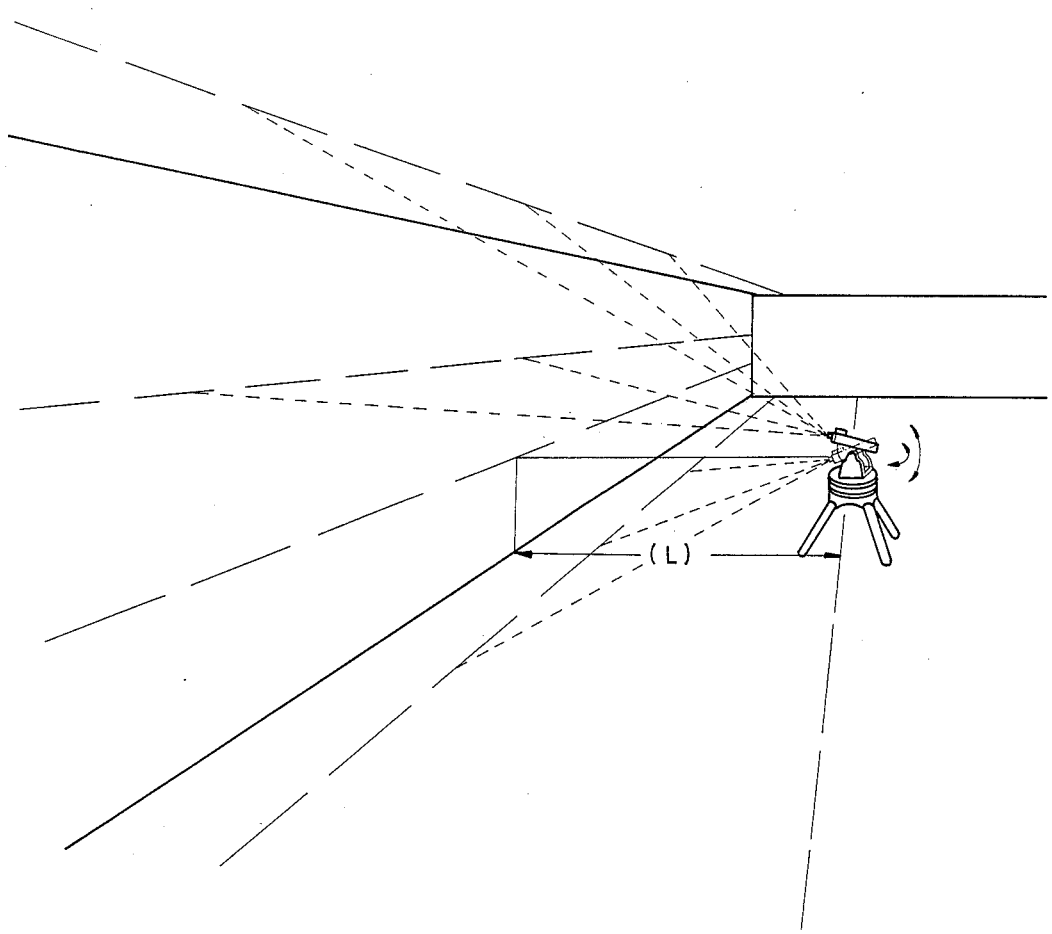
FIG. 9 is the prospective sketch of the datum at different elevations from free station for the present invention.

For further illustration to the present invention, there are applied preferred embodiments to be described as follows:

Free station horizontal line: after a measuring instrument (MS) is positioned at a certain measuring station, surveying instrument levelling, the spherical plane adjustor can be elevated or depressed, the angle reading base of the surveying instrument turns back to zero, as FIG. 8 shown, set one point in the direction of point A and fix the angle reading base, press the wave distance measure, then rotates 90° in the direction of point B and press wave distance measure button again, at the time, the H value of the triangle and each angle (LA and RA) left and right of the boundary can be obained by the surveying instrument, according to the angle value on right, the operator turns the surveying instrument back on the H boundary line to from T, that is, the azimuth of the wall has been known as the LA and RA are obtained, rotate the surveying instrument back on the H boundary just as the second principle to rotate the surveying insturment at angle of 90° in direction of object, now all are locked, all we need is to adjust the spherical plane, please refer to FIG. 9, (L) is equal to the H value of the triangle, after the wall is signed with the sign of any elevation, making use of the adjustment of the spherical plane and searching by the telescope, when the telescope has swept the elevation of the object, any point of the horizontal cross hair of the telescope sweeps in an angle of 85° left and right is the same elevation.

Figure 10:
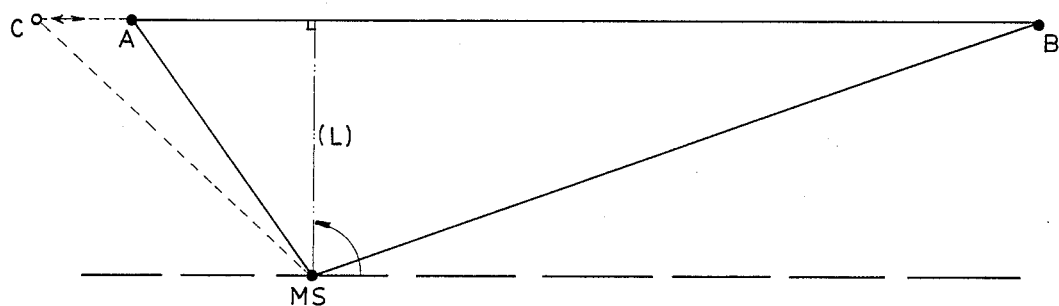
FIG. 10 is the sketch to set free datum at different elevations for the present invention.
Figure 11:
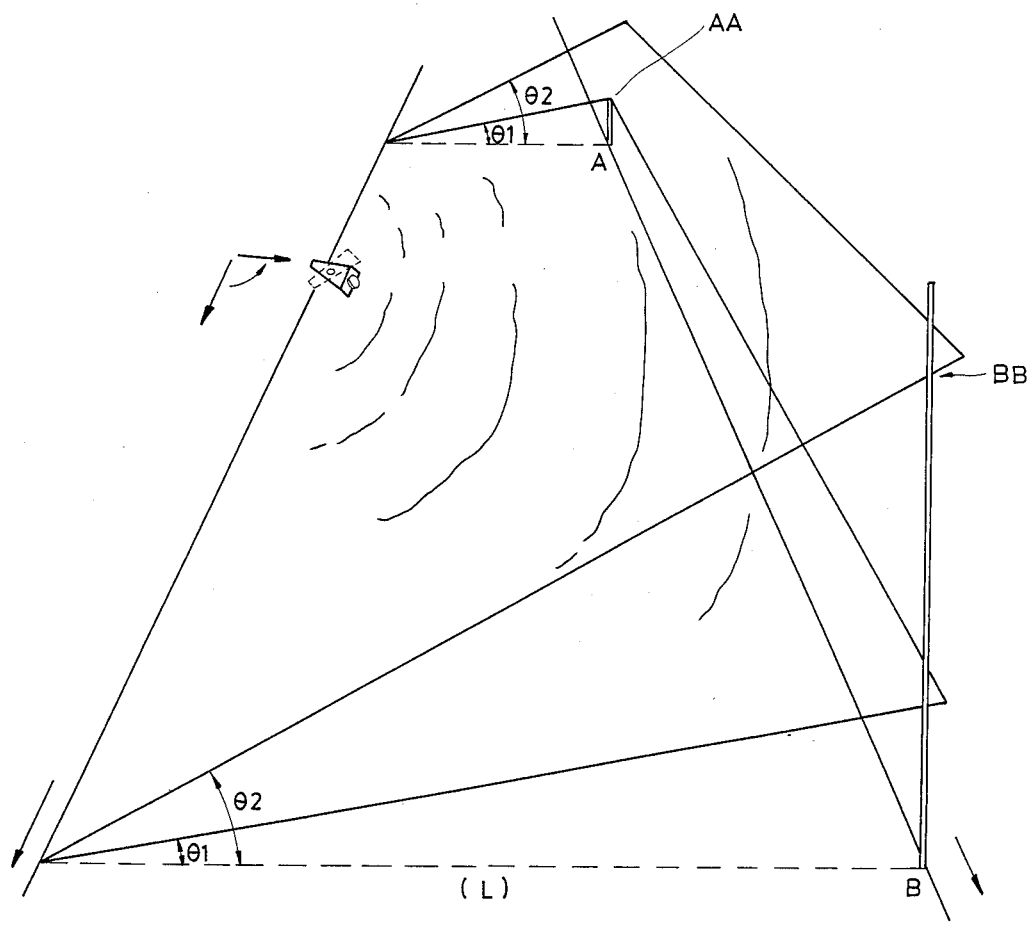
FIG. 11 is the prospective sketch to set the free datum at different elevations for the present invention.

Free station setting: set as unknown elevation by a known elevation. A shown in FIG. 10, the compass (C) is positioned to survey the bearing angle and do not matter wherever it is, all it relates with the surveying instrument is to be the same bearing angle; when the elevation position (AA) of the known number A has been swept from the telescope of the measuring instrument (MS), the distance value of (L) can be got from the angle 1 of the spherical plane adjustor $L = AA \div TAN\theta 1$, (L) to be a reference number, please refer to FIG. 11, the angle ($\theta$) that the spherical plane adjustor can be obtained with the (L) value to be known and the elevation value (BB) will be set, $\theta = ATN(BB \div L)$, after the angle has adjusted, the elevation position to be set can be found from the telescope.

To survey the difference of elevations: please compares with the conventional way shown in FIG. 1.

Please refer to FIG. 12, the compass is positioned at point A to survey the bearing angle of point A and B, the measuring station (MS) is positioned for convenience to sweep point A and B in principle, the surveying instrument is aimed at the reflector on top of the compass to survey the (L) distance value, if it is necessary to know the distance between point A and B or the horizontal distance of point A and B or the grade of slope, the scale base has to be rotate to zero or rotates rightwards from point A to the vertical line of the line A to B to write down the angle A after the distance value (L) has been surveyed, then aim at point B from the vertical line to write down the angle B, then turns back to the same bearing angle and rotates 90° in direction of the object.

Now the (L) value, angle A and angle B have been known, as a beginning to adjust the spherical plane adjustor, enable the telescope to sweep to point A and mark the first difference of elevation, then rotate the telescope at the direction of point B, adjust the spherical plane adjustor raising up to the target B can be swept from the telescope, thus the angle of elevation (SA) can be obtained, the difference of elevation and the distance value that in need also can be obtained (by process of the computer). To compare with the conventional way, it can decrease the number of turning point in the process and enable the work to be fast and simple. The main formulas are shown as follows: suppose L, $\theta A$, $\theta B$, $\theta SA$ are known $LA = L \times COS\theta A$  $H = LA \times TAN\theta SA$  $P = LA \times TAN\theta A + LA \times TAN\theta B$  $\theta D = ATN(H \div P)$  $S = P \div COS\theta D$ Surveying to pass through obstruction: please compare with the conventional way shown in FIG. 2.

As shown in FIG. 13, when the distance between B and D is surveyed, the surveying instrument is positioned at point B and compass can be positioned at a free point C, first the distance value (L) between B and C has been surveyed from the measuring station, then rotates to the point D to get angle $\theta$ from C and tuns rightwards continuously in the direction of C and D to get the angle V, thus the surveying has been finished, when distance is surveyed only, it is unnecessary to rotates back 90° and to adjust the spherical plane adjustor, this is triangle surveying in disguised form. No need to move the surveying instrument is simpler than the conventional.

The basic formula: $\theta 1 = V - \theta$  $\theta 2 = 180 - \theta 1 - \theta$  $\theta 3 = 90 - \theta 2$  $LA = L \times COS\theta 3$  $\theta 4 = 90 - \theta 1$  $BD = LA \div COS\theta 4$ Slope surveying that two points can not see through: please compare with the conventional way shown in FIG. 3.

Figure 14:
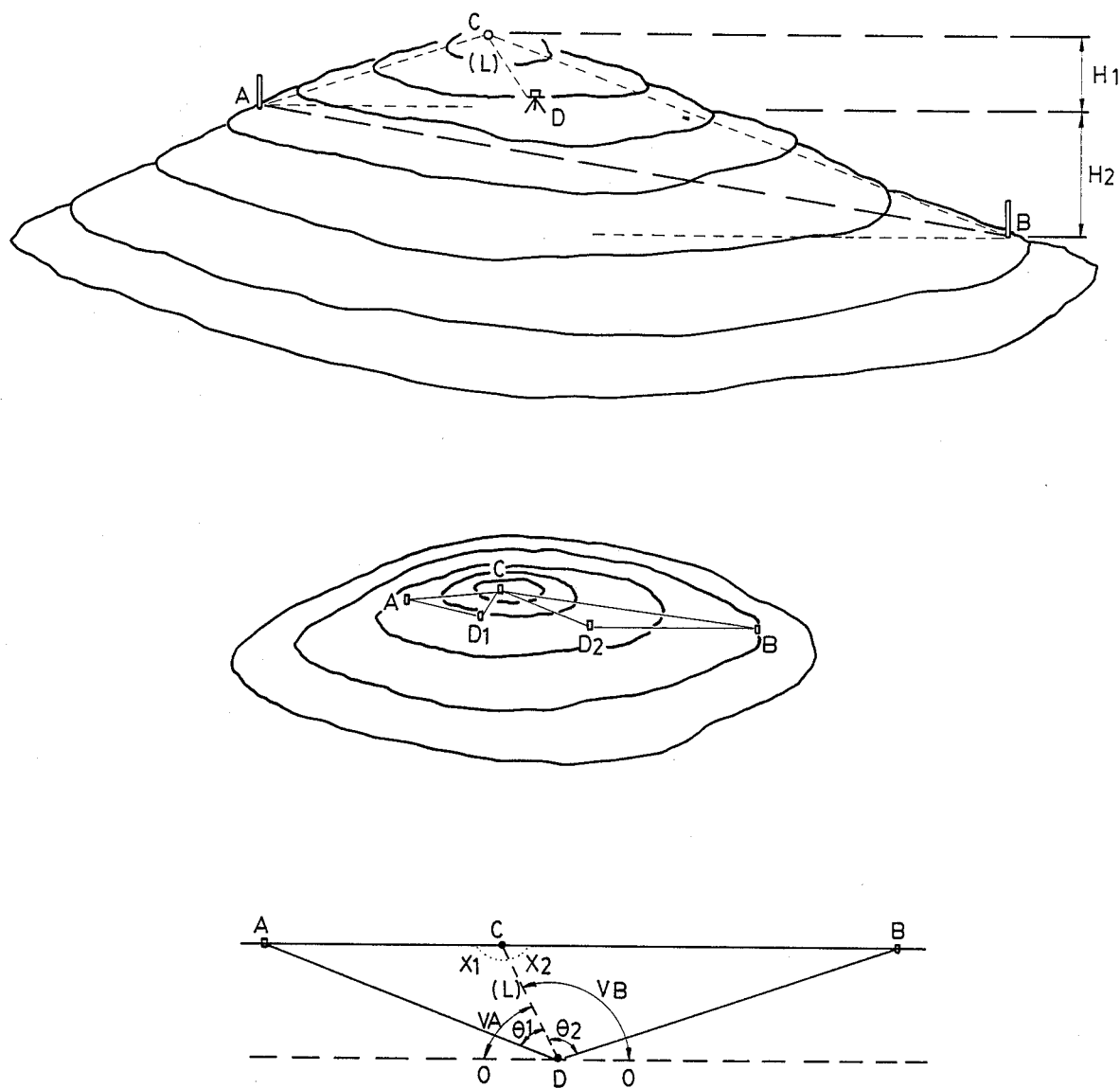
FIG. 14 is the surveying sketch that two points can not see through on the slope for the present invention.

Please refer to FIG. 14, first the compass is positioned at the intersection point on the straight line of point A and B as the C in the figure and surveys the bearing angle of point A and B.

Surveying instrument can be positioned at any suitable place to be point D, then surveys the (L) distance value between C and D, included angle $\theta 1$ of C, A and angle VA, the included angle $\theta 2$ of C, B and the angle VB, if the difference of elevation has to be got, adjust the surveying instrument in direction of the bearing angle to rotate 90° and sweep at the angle of the spherical plane to point A, B and C, thus the angle of the point A, B and C can be obtained, all the rest of the process is the work of computer (please refer to the formulas shown above). The present invention "Free station surveying method" that can prevent the surveying instrument from moving often in the conventional way to be positioned on the straight line between two points, it is more conventional and saving time. When the point A and B can not be surveyed simultaneously with the surveying instrument, the surveying instrument can be moved to another place to be two measuring station D1 and D2 as shown in the figure.

As described above, the present invention certainly provides a surveying method that more advantage than the conventional, saving a great number of work and time, enable the surveying inclining to more convenient and simpler in the surveying field.

I claim:

1. A method for surveying a straight line between a first point and a second point comprising the steps of:
   locating a surveying instrument having a telescope at the second point;

locating a compass at a third point separated by a measured distance (L) from said second point;

determining the bearing angle from said third point to said first point by said compass;

aligning the longitudinal axis of said telescope at said bearing angle;

measuring the angle (V) between the longitudinal axis of said telescope and a straight line between said second point and said third point;

measuring the angle ($\theta_1$) between a straight line between said second point and said first point and a straight line between said second point and said third point;

defining a rotated reference line by rotating the longitudinal axis of said telescope 90° in a direction toward said first point, whereby said rotated reference line and said straight line between said second point and said third point form an angle $\theta_3$ equal to 90° $-$ V; and calculating the distance (S) between said first point and said second point using said values for L, $\theta_1$ and $\theta_3$.